(12) United States Patent
Harrison et al.

(10) Patent No.: US 8,499,915 B2
(45) Date of Patent: *Aug. 6, 2013

(54) QUICK DISCONNECT COUPLING

(75) Inventors: William L. Harrison, Cincinnati, OH (US); William M. Oliver, Cincinnati, OH (US); Jeffrey D. Wightman, Beavercreek, OH (US)

(73) Assignee: F. R. Drake, Waynesboro, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,839

(22) Filed: Feb. 14, 2012

(65) Prior Publication Data

US 2012/0211321 A1    Aug. 23, 2012

Related U.S. Application Data

(60) Continuation of application No. 12/967,214, filed on Dec. 14, 2010, now Pat. No. 8,113,328, which is a division of application No. 11/980,343, filed on Oct. 31, 2007, now Pat. No. 7,849,991, which is a division of application No. 11/094,870, filed on Mar. 31, 2005, now abandoned.

(60) Provisional application No. 60/558,535, filed on Apr. 1, 2004.

(51) Int. Cl.
*F16D 11/14* (2006.01)
*F16D 3/64* (2006.01)

(52) U.S. Cl.
USPC .......... 192/55.2; 192/69.83; 464/73; 464/76; 464/182

(58) Field of Classification Search
USPC .................. 192/55.2, 55.3, 69.6–69.62, 69.8, 192/69.82, 69.83, 69.7, 69.71, 108, 53.4, 192/53.5; 464/73, 75, 85, 76
See application file for complete search history.

(56) References Cited

U.S. PATENT DOCUMENTS

| | | | | |
|---|---|---|---|---|
| 2,616,273 A | * | 11/1952 | Pringle | 464/73 |
| 3,396,556 A | * | 8/1968 | Giegerich | 464/73 |
| 3,529,440 A | * | 9/1970 | Bauer | 464/73 |
| 3,537,558 A | * | 11/1970 | Bibbens | 192/108 |
| 3,831,724 A | * | 8/1974 | Baer | 464/73 |
| 3,837,179 A | * | 9/1974 | Barth | 464/182 |
| 3,884,049 A | * | 5/1975 | Pauli | 464/73 |
| 3,902,333 A | * | 9/1975 | Dossier | 464/73 |
| 4,655,729 A | * | 4/1987 | Kottke | 464/73 |
| 4,678,452 A | * | 7/1987 | Nelson et al. | 464/73 |
| 7,849,991 B2 | * | 12/2010 | Harrison et al. | 192/55.2 |

* cited by examiner

*Primary Examiner* — Rodney Bonck
(74) *Attorney, Agent, or Firm* — Berenato & White, LLC

(57) ABSTRACT

A quick disconnect coupling including a first hub, a shaft fixedly connected to the first hub, the shaft being non-round in cross-section, and a second hub having a non-round recess extending therethrough, the non-round recess being sized to closely receive the shaft such that the second hub is capable of sliding along the shaft and is prevented from rotating about the shaft, wherein rotation of the first hub results in corresponding rotation of the second hub.

20 Claims, 4 Drawing Sheets

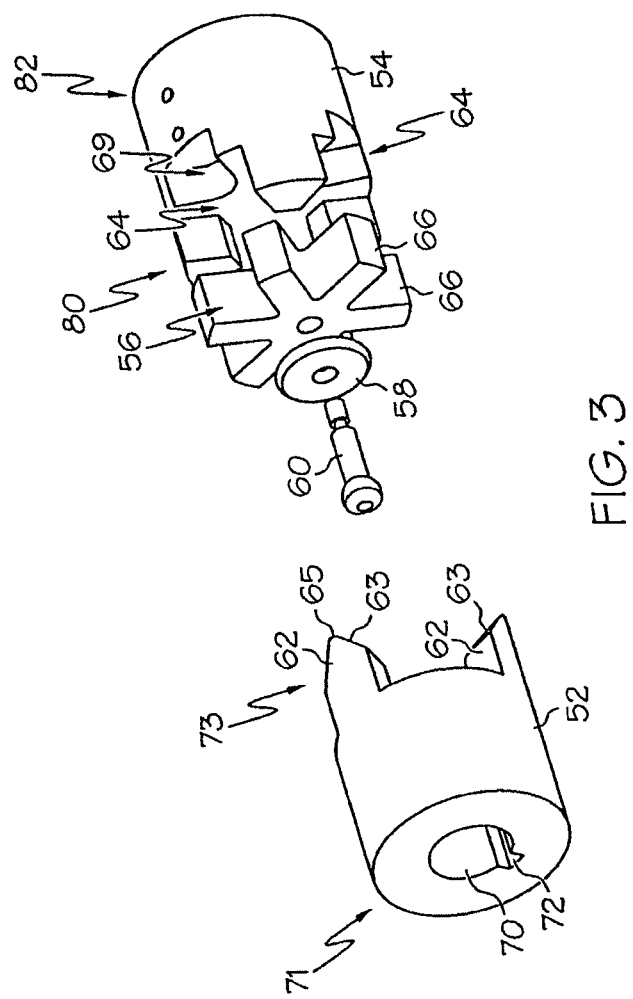

QUICK DISCONNECT COUPLING

CROSS-REFERENCE TO RELATED APPLICATION AND CLAIM TO PRIORITY

This application is a continuation of application Ser. No. 12/967,214, filed Dec. 14, 2010, now U.S. Pat. No. 8,113,328, which is a divisional of application Ser. No. 11/980,343, filed Oct. 31, 2007, now U.S. Pat. No. 7,849,991, which is a divisional of application Ser. No. 11/094,870, filed Mar. 31, 2005, now abandoned, which claims priority from U.S. Provisional Patent App. No. 60/558,535 filed on Apr. 1, 2004, the disclosures of which are incorporated here by reference and to which priority is claimed.

BACKGROUND

The present application relates to coupling devices and, more particularly, to coupling devices capable of being quickly disconnected.

Coupling devices are typically used on various types of equipment to transfer power from a first rotating shaft to a second rotating shaft. It is often desirable to disconnect a coupling such that equipment embodying the coupling may be cleaned. However, often times, it may be quite time consuming to disconnect the couplings.

Accordingly, there is a need for coupling devices that may be quickly disconnected and reconnected.

SUMMARY

A first aspect of the quick disconnect coupling includes a first hub, a shaft fixedly connected to the first hub, the shaft being non-round in cross-section, and a second hub having a non-round recess extending therethrough, the non-round recess being sized to closely receive the shaft such that the second hub is capable of sliding along the shaft and is prevented from rotating about the shaft, wherein rotation of the first hub results in corresponding rotation of the second hub.

A second aspect of the quick disconnect coupling includes a male coupling member having at least two jaws thereon, a female coupling member having at least two recesses for receiving the jaws, and a spider having at least four wings extending therefrom, the spider being shaped to be received within the female coupling member such that each of the recesses includes at least two of the wings, wherein each jaw of the male coupling member is positioned between two wings of the spider when the male coupling member is engaged with the female coupling member.

A third aspect of the quick disconnect coupling includes a drive shaft, a motor, and a coupling device for transferring rotational power from the motor to the drive shaft, the coupling device including a first hub, a non-round shaft fixedly connected to the first hub, a second hub closely and slidably received over the non-round shaft, the second hub having a recess for receiving the drive shaft, and a spring for biasing the first hub away from the second hub, wherein the first hub is connected to the motor and the second hub is selectively connectable to the drive shaft.

Other aspects of the quick disconnect coupling will be apparent from the following description, the accompanying drawings, and the appended claims.

BRIEF DESCRIPTION OF THE DRAWINGS

FIG. 3 is an exploded perspective view of a second aspect of the quick disconnect coupling;

DETAILED DESCRIPTION

Figure 1A:
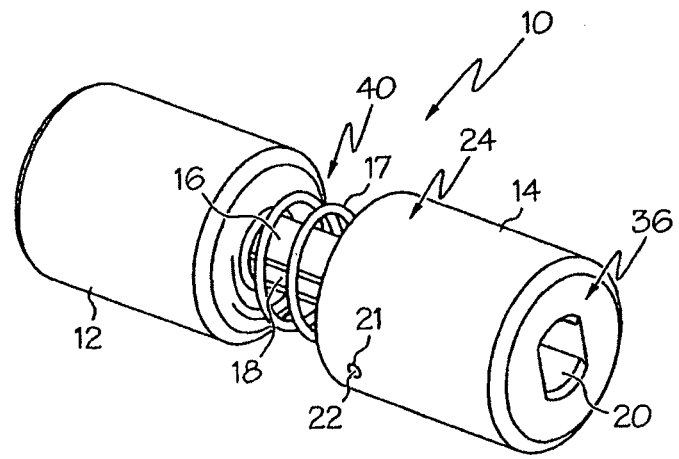
FIG. 1A is a front perspective view of a first aspect of the quick disconnect coupling.
Figure 1B:
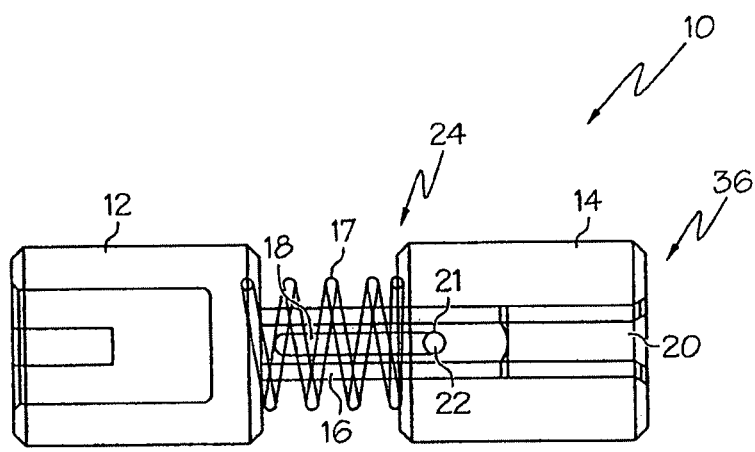
FIG. 1B is a side elevational view of the quick disconnect coupling of FIG. 1A.

As shown in FIGS. 1A and 1B, a first aspect of the quick disconnect coupling, generally designated 10, includes a male hub 12, a female hub 14, a non-round shaft 16, a spring 17 and a pin 22.

The non-round shaft 16 may be attached to or integral with (i.e., shaft 16 is connected to) the male hub 12 and may include a slot 18 extending axially along the non-round shaft 16 and through a surface of the non-round shaft 16. The non-round shaft 16 may have any shape in cross-sectional view (taken perpendicular to the axis of the shaft) other than circular, hence the designation as non-round. For example, in cross-sectional view, the non-round shaft 16 may be square, rectangular, triangular, pentagonal, hexagonal or elliptical.

The female hub 14 may include a first end 24, a second end 36 and a non-round recess 20 extending axially through the length of the female hub 14. The non-round recess 20 is non-round in shape, as described above, and has a shape corresponding to the shape of the non-round shaft 16 such that the non-round shaft 16 may be closely received within the non-round recess 20. The female hub 14 may slide relative to the male hub 12 along the non-round shaft 16 and rotation of the male hub 12 (and corresponding rotation of the non-round shaft 16) results in rotation of the female hub 14 due to the non-round shape of the shaft 16 and recess 20.

The spring 17 may be a coil spring and may be position coaxially over the non-round shaft 16 and between the male hub 12 and female hub 14 to bias the female hub 14 away from the male hub 12. The pin 22 may be inserted through an opening 21 in the first end 24 of the female hub 14 such that the pin 22 engages the slot 18 in the non-round shaft 16, thereby restricting movement of the female hub 14 relative to the male hub 12 along the shaft 16.

Figure 2:
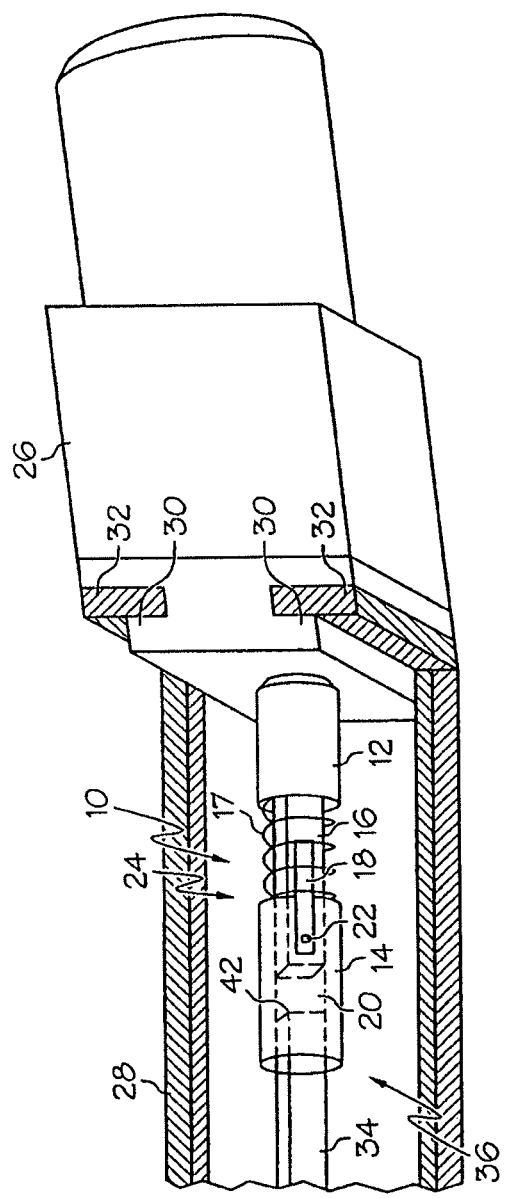
FIG. 2 is a front perspective view of the quick disconnect coupling of FIG. 1A embodied on a motor for use with a piece of equipment having a drive shaft.

As shown in FIG. 2, the quick disconnect coupling 10 may be attached to a motor 26 for connecting the motor 26 to a drive shaft 34 of a piece of equipment 28. The drive shaft 34 may include an end portion 42 and may be shaped to be received within the recess 20 of the female hub 14 (i.e., non-round in shape) such that rotation of the female hub 14 results in corresponding rotation of the drive shaft 34 when the drive shaft 34 is received within the recess 20.

The motor 26 may be slideably mounted onto the piece of equipment 28 by sliding a pair of wings 32 of the piece of equipment 28 between the body of the motor 26 and flanges 30.

The male hub 12 of the coupling 10 may be fixedly attached to the shaft (not shown) of the motor 26. The female hub 14 may then be attached to the drive shaft 34 of the equipment 28 as follows: First, the female hub 14 is retracted against the bias of the spring 17 and toward the male hub 12. Then, the motor 26 may be slid onto the equipment 28 as described above (i.e., via flanges 30). When the female hub 14 is released, thereby allowing the spring 17 to bias the female hub 14 to its forward and engaged position, the drive shaft 34 of the equipment 28 is received within the recess 20 of the female hub 14 such that power from the motor 26 may be transferred to the drive shaft 34 by rotation of the male hub 12 which results in rotation of the non-round shaft 16 which results in rotation of the female hub 14 and corresponding rotation of the drive shaft 34.

The quick disconnect coupling 10 may be disconnected from the drive shaft 34 as follows: The female hub 14 may be retracted against the bias of the spring 17 into close proximity with the male hub 12 such that the drive shaft 34 is no longer received within the recess 20 and the second end 36 of the female hub 14 is cleared from an end portion 42 of the drive shaft 34. The motor 26 may then be slid off of the equipment 28.

Figure 4A:
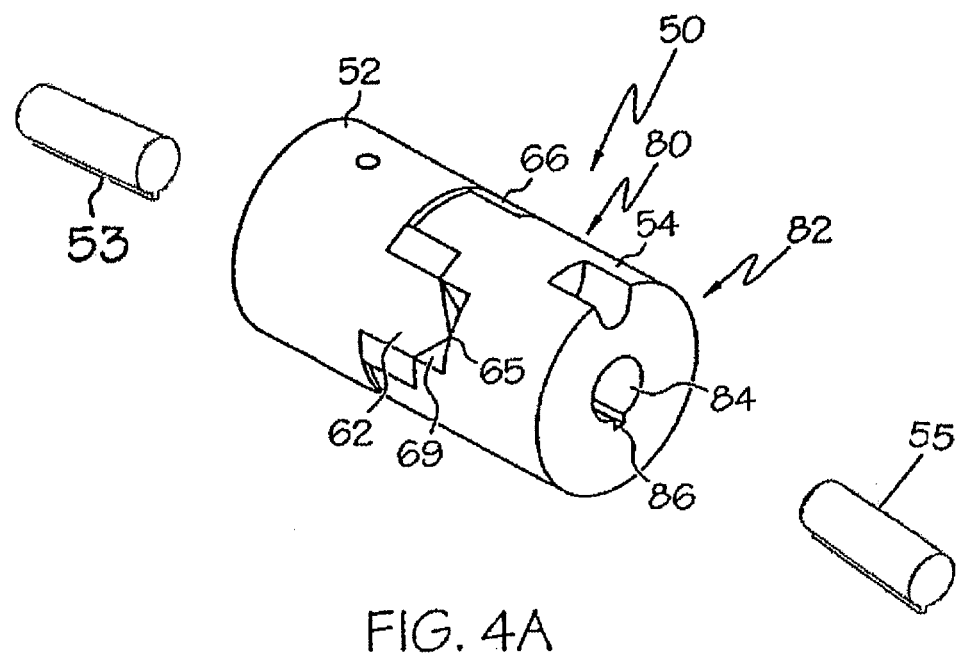
FIG. 4A is a front perspective view of the quick disconnect coupling of FIG. 3 in an engaged position.
Figure 4B:
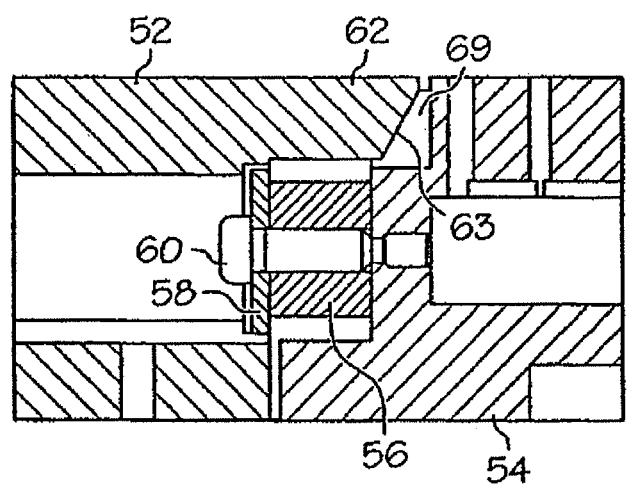
FIG. 4B is a front elevational view, in section, of the quick disconnect coupling of FIG. 4A.

As shown in FIGS. 3, 4A and 4B, a second aspect of the quick disconnect coupling, generally designated 50, includes a male coupling member 52, a female coupling member 54, a spider 56 and a connector such as a washer 58 and screw 60 assembly.

The male coupling member 52 may be generally cylindrical in shape and include a first end 71 and a second end 73. Three jaws 62 may be spaced equidistantly about the periphery of the second end 73 and extend axially from the male coupling member 52. Each jaw 62 may include a beveled surface 63 and be tapered to a point 65. The first end 71 may include a recess 70 having a slot 72 therein. The recess 70 may receive a first shaft (not shown) having a notch (not shown) that engages the slot 72 for preventing rotation of the first shaft relative to the male coupling member 52 such that rotation of the first shaft results in corresponding rotation of the male coupling member 52.

The female coupling member 54 may be generally cylindrical in shape and include a first end 80 and a second end 82. Three recesses 64 may be spaced equidistantly about the periphery of the first end 80 for receiving the three jaws 62 of the male coupling member 52. Each recess 64 may additionally include a secondary recess 69 for receiving the tapered point 65 of the jaw 62. The recesses 64 and their respective secondary recesses 69 each collectively establish a pair of shoulders on opposite sides of the secondary recesses 69. As shown in FIG. 4B, the second end 82 may include a recess 84 having a slot 86 therein. The recess 84 may receive a second shaft (not shown) having a notch (not shown) that engages the slot 86 for preventing rotation of the second shaft relative to the female coupling member 54 such that rotation of the second shaft results in corresponding rotation of the female coupling member 54 and rotation of the female coupling member 54 results in corresponding rotation of the second shaft.

As best shown in FIG. 3, the spider 56 includes six wings 66 equidistantly spaced with opposite, parallel planar surfaces extending radially from the center of the spider 56. The spider 56 is received within the first end 80 of the female coupling member 54 such that each recess 64 receives two wings 66 of the spider 56. The spider 56 may be made of a soft or hard polymeric material such as urethane or any other suitable rigid material.

The spider 56 may be fixedly attached to the female coupling member 54 by any suitable connector, such as a washer 58 and screw 60 assembly such that the spider 56 is fixed onto the female coupling member 54 thereby preventing the spider 56 from easily falling away from the coupling assembly 50 when the coupling assembly 50 is disconnected.

Accordingly, the male coupling member 52 may be connected to a first shaft (not shown) and the female coupling member 54 may be connected to a second shaft (not shown) and the two shafts may be coupled by engaging the male coupling member 52 with the female coupling member 54, as shown in FIG. 4A. As also shown in FIG. 4A, the jaw 62 is positioned between and contacts one of the opposite parallel planar surfaces of both adjacent wings 66 of the spider 56. The spider 56 creates a tight fit between the jaws 62 and recesses 64 and allows for the transfer of rotational power between the male and female coupling members 52, 54 even if the first and second shafts are not perfectly aligned. The beveled surface 63 and tapered point 65 of each jaw 62 guide the jaws 62 into engagement with the recesses 64 such that each jaw 62 is positioned between two wings 66 in the recess 64 and the tapered point 65 engages the secondary recess 69. Therefore, as the male coupling member 52 rotates due to the rotation of the first shaft, the female coupling member 54 and second shaft rotate accordingly.

The coupling assembly 50 may be disconnected by withdrawing the jaws 62 of the male coupling member 52 from the recesses 64 of the female coupling member 54. When disconnected, the spider 56 remains connected to the female coupling member 54 by the washer 58 and screw 60 assembly, thereby simplifying the disassembly process.

Although the quick disconnect coupling is shown and described with respect to certain aspects, it is obvious that modifications will occur to those skilled in the art upon reading and understanding the specification. The quick disconnect coupling includes all such modifications and is limited only by the scope of the claims.

What is claimed is:

1. A quick disconnect coupling comprising:
    a male coupling member comprising a plurality of jaws, the plurality of jaws comprising first and second jaws terminating at respective first and second jaw ends;
    a female coupling member comprising a plurality of recesses and a plurality of secondary recesses, the plurality of recesses comprising first and second recesses for receiving the first and second jaws, respectively, the plurality of secondary recesses comprising first and second secondary recesses for receiving the first and second jaw ends, respectively; and
    a spider comprising a plurality of wings extending radially outward, the plurality of wings comprising first and second wings configured for receipt in the first recess and third and fourth wings configured for receipt in the second recess, the first, second, third and fourth wings each having opposite parallel planar surfaces,
    wherein the male coupling member and the female coupling member are configured for engagement and disengagement with one another, wherein in an engaged state the first jaw is positioned between and contacts one of the opposite parallel planar surfaces of each of the first and second wings, the first jaw end extending into and engaging the first secondary recess.

2. The quick disconnect coupling of claim 1, wherein in the engaged state the second jaw is positioned between and contacts one of the opposite parallel planar surfaces of each of the third and fourth wings, the second jaw end extending into and engaging the second secondary recess.

3. The quick disconnect coupling of claim 1, further comprising a connector for fixedly connecting the spider to the female coupling member.

4. The quick disconnect coupling of claim 3, wherein the connector comprises a washer and screw assembly.

5. The quick disconnect coupling of claim 1, wherein the jaws of the plurality of jaws of the male coupling member are equidistantly spaced from one another about a circumference of the male coupling member.

6. The quick disconnect coupling of claim 1, wherein the male coupling member is connected to a first shaft and the female coupling member is connected to a second shaft such that rotation of the first shaft is translated into corresponding rotation of the second shaft when the male and female coupling members are engaged with one another.

7. The quick disconnect coupling of claim 1, wherein the male coupling member comprises a slot for rotationally coupling the male coupling member to a notch of a shaft.

8. The quick disconnect coupling of claim 1, wherein the secondary recesses are concave.

9. The quick disconnect coupling of claim 1, wherein the first and second jaw ends comprise first and second tapering end portions, respectively.

10. The quick disconnect coupling of claim 9, wherein an entirety of first and second tapering end portions are received in the first and second secondary recesses, respectively.

11. A quick disconnect coupling comprising:
a male coupling member comprising a plurality of jaws, the plurality of jaws comprising first and second jaws terminating at respective first and second jaw ends;
a female coupling member comprising a plurality of recesses and a plurality of secondary recesses, the plurality of recesses comprising first and second recesses for receiving the first and second jaws, respectively, the plurality of secondary recesses comprising first and second secondary recesses for receiving the first and second jaw ends, respectively, the first recess and the first secondary recess collectively establishing first shoulders on opposite sides of the first secondary recess, the second recess and the second secondary recess collectively establishing second shoulders on opposite sides of the second secondary recess; and
a spider comprising a plurality of wings extending outwardly, the plurality of wings comprising first and second wings configured for receipt on the first shoulders and third and fourth wings configured for receipt on the second shoulders, the first, second, third and fourth wings each having opposite parallel planar surfaces, wherein the male coupling member and the female coupling member are configured for engagement and disengagement with one another, wherein in an engaged state the first jaw is positioned between and contacts one of the opposite parallel planar surfaces of each of the first and second wings, with the first jaw end extending pass the first shoulders to engage the first secondary recess.

12. The quick disconnect coupling of claim 11, wherein in the engaged state the second jaw is positioned between and contacts one of the opposite parallel planar surfaces of each of the third and fourth wings, with the second jaw end extending pass the second shoulders to engage the second secondary recess.

13. The quick disconnect coupling of claim 11, further comprising a connector for fixedly connecting the spider to the female coupling member.

14. The quick disconnect coupling of claim 13, wherein the connector comprises a washer and screw assembly.

15. The quick disconnect coupling of claim 11, wherein the jaws of the plurality of jaws of the male coupling member are equidistantly spaced from one another about a circumference of the male coupling member.

16. The quick disconnect coupling of claim 11, wherein the male coupling member is connected to a first shaft and the female coupling member is connected to a second shaft such that rotation of the first shaft is translated into corresponding rotation of the second shaft when the male and female coupling members are engaged with one another.

17. The quick disconnect coupling of claim 11, wherein the male coupling member comprises a slot for rotationally coupling the male coupling member to a notch of a shaft.

18. The quick disconnect coupling of claim 11, wherein the secondary recesses are concave.

19. The quick disconnect coupling of claim 11, wherein the first and second jaw ends comprise first and second tapering end portions, respectively.

20. The quick disconnect coupling of claim 19, wherein an entirety of first and second tapering end portions are received in the first and second secondary recesses, respectively.

* * * * *